(12) United States Patent
Kato et al.

(10) Patent No.: US 8,033,801 B2
(45) Date of Patent: Oct. 11, 2011

(54) LIQUID CHEMICAL SUPPLY SYSTEM AND LIQUID CHEMICAL SUPPLY CONTROL DEVICE

(75) Inventors: Takashi Kato, Komaki (JP); Nobuya Suzuki, Komaki (JP)

(73) Assignee: CKD Corporation, Komaki-shi (JP)

( * ) Notice: Subject to any disclaimer, the term of this patent is extended or adjusted under 35 U.S.C. 154(b) by 411 days.

(21) Appl. No.: 11/984,194

(22) Filed: Nov. 14, 2007

(65) Prior Publication Data

US 2008/0145248 A1    Jun. 19, 2008

(30) Foreign Application Priority Data

Nov. 24, 2006    (JP) .................................. 2006-316937

(51) Int. Cl.
   *F04B 43/00*    (2006.01)
(52) U.S. Cl. ........................ 417/472; 417/417; 417/46
(58) Field of Classification Search ............... 417/46, 417/395, 472, 417
   See application file for complete search history.

(56) References Cited

U.S. PATENT DOCUMENTS

| | | | | |
|---|---|---|---|---|
| 4,725,207 | A * | 2/1988 | Buchwald et al. | 417/412 |
| 4,873,489 | A * | 10/1989 | Melcher et al. | 324/453 |
| 7,241,115 | B2 * | 7/2007 | Luongo et al. | 417/53 |
| 2007/0267065 | A1 * | 11/2007 | Okumura et al. | 137/208 |

FOREIGN PATENT DOCUMENTS

| | | |
|---|---|---|
| JP | U-48-023103 | 7/1973 |
| JP | A-08-296564 | 11/1996 |
| JP | A-10-054368 | 2/1998 |
| JP | A-11-343978 | 12/1999 |
| JP | A-2006-316711 | 11/2006 |
| JP | A-2007-051563 | 3/2007 |
| JP | A-2007-154733 | 6/2007 |
| WO | WO 2006016486 A1 * | 2/2006 |

OTHER PUBLICATIONS

Office Action issued in JP Application No. 2006-316937 on Jul. 12, 2011 (with English translation).

* cited by examiner

*Primary Examiner* — Charles Freay
*Assistant Examiner* — Todd D Jacobs
(74) *Attorney, Agent, or Firm* — Oliff & Berridge, PLC

(57) ABSTRACT

The occurrence of fluctuations in liquid chemical during the discharge and intake thereof in a device that employs a liquid chemical supply pump 10 that discharges liquid chemical taken in by means of a change in volume inside a pump chamber 16 that accompanies the displacement of a bellows type partition 14. The amount of fluctuation in the bellows type partition member 14 that accompanies the operation of a discharge side valve 32 will be detected by a displacement sensor 58. The amount of fluctuation is a parameter that indicates a correlation with the abrupt flow of liquid chemical that accompanies the opening of the discharge side valve 32. Thus, the amount of fluctuation will be reduced, and the pressure inside a pump chamber 16 prior to the opening of the discharge side valve 32 will be controlled.

5 Claims, 13 Drawing Sheets

FIG. 2
(a)
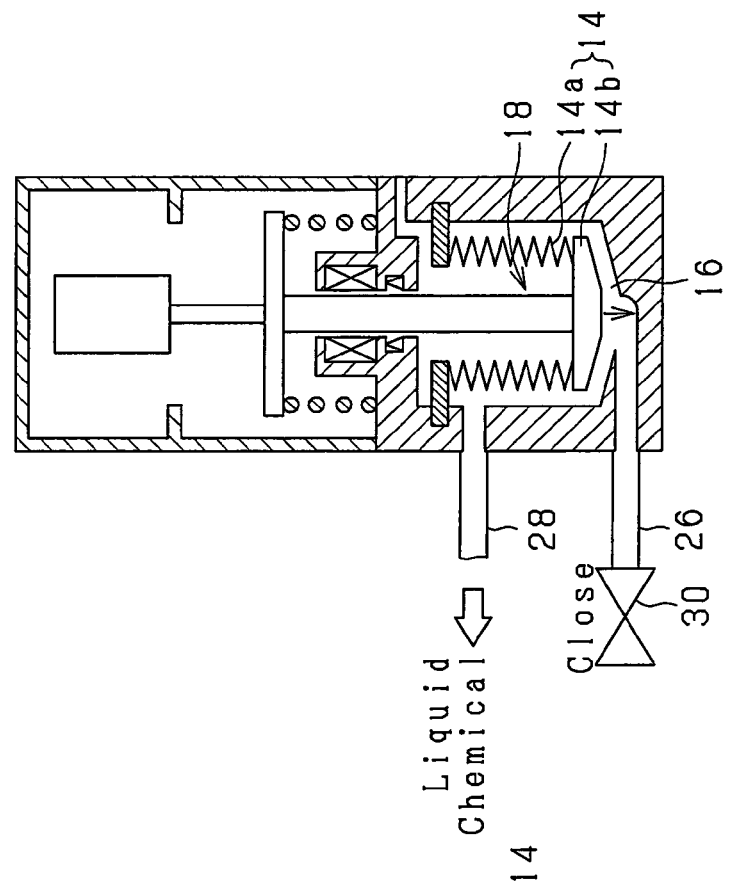
(b)
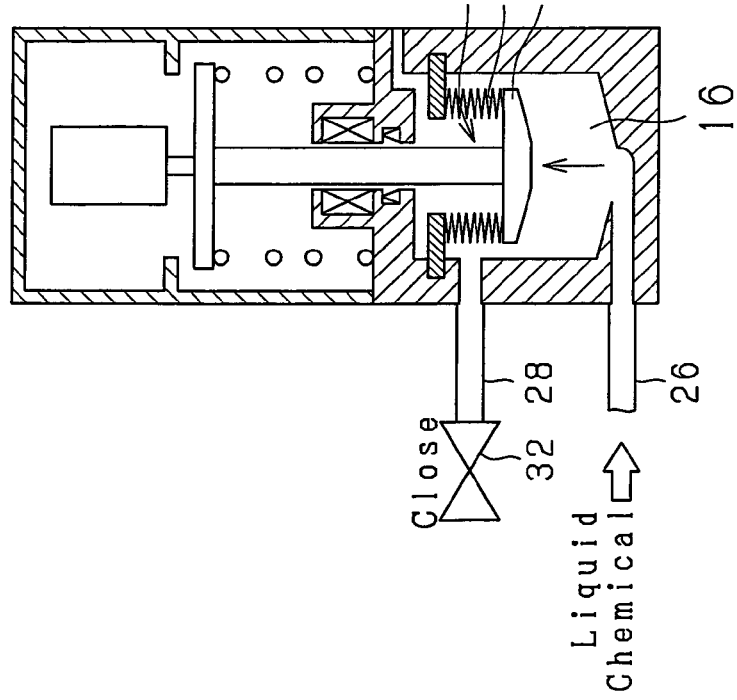

LIQUID CHEMICAL SUPPLY SYSTEM AND LIQUID CHEMICAL SUPPLY CONTROL DEVICE

The present application claims priority based on Japan Patent Application No. 2006-316937 filed on Nov. 24, 2006, and the entire contents of that application is incorporated by reference in this specification.

FIELD OF THE INVENTION

The present invention relates to a liquid chemical supply system, and a liquid chemical supply control device inside this system, that employs a liquid chemical supply pump to discharge, via a discharge port, liquid chemical that was drawn in from an intake port due to a change in the volume of a pump chamber that accompanies the displacement of a volume varying member.

BACKGROUND ART

For example, in the semiconductor manufacturing process, a liquid chemical supply device is employed in order to drip a predetermined amount of liquid chemical such as photo resist fluid or the like onto a semiconductor wafer. More specifically, as shown for example in Japanese Published Patent Application H10-54368, a device is proposed that comprises volume varying members (bellows) that each partition a pair of pump chambers, motors that cause each bellows to expand and contract, and check valves arranged in each discharge port and intake port of a pair of pumps. In this way, the check valve on the intake port side will be mechanically opened and liquid chemical will be taken into the pump chamber when the bellows contract. In contrast, the check valve on the discharge port side will be mechanically opened and liquid chemical will be discharged from the pump chamber to the exterior when the bellows expand. Then, by sequentially expanding and contracting the pair of bellows, the liquid chemical can be continuously discharged.

SUMMARY OF THE INVENTION

However, in the aforementioned liquid chemical supply device, pressure variations may occur when the pump chamber on the side that discharges liquid chemical is switched. In other words, because the check valves will open and close in response to a pressure differential between the upstream and downstream sides, there will be a tendency for the discharge pressure of the liquid chemical to be higher than the pressure on the downstream side of the check valve when the check valve on the discharge port side is opened. Because of this, there may be pressure variations in the combined flow out of the discharge ports of the pair of pumps, and there may therefore be fluctuations in the flow rate of the liquid chemical.

Note that not just the aforementioned device, but almost all devices in which a liquid chemical supply pump that discharges, via a discharge port, liquid chemical drawn in from the intake port due to a change in volume in the pump chamber that accompanies the displacement of a volume varying member, share the problem of fluctuations in the liquid chemical during the discharge and intake of the liquid chemical.

The present invention serves to solve the aforementioned problems, and an object thereof is to provide a liquid chemical supply system and a liquid chemical supply device that employs a liquid chemical supply pump that will discharge, via a discharge port, liquid chemical drawn in from an intake port due to a change in the volume of a pump chamber that accompanies the displacement of a volume varying member, and that can suitably inhibit fluctuations in the liquid chemical during the discharge and intake of liquid chemical.

An aspect of the invention of means 1 is a liquid chemical supply system that can comprise a liquid chemical supply pump that discharges, via a discharge port, liquid chemical drawn in from an intake port due to a volume change inside a pump chamber that accompanies the displacement of a volume varying member, an open/close means that electrically opens and closes at least one of the discharge ports and the intake ports, a pressure application means that applies pressure inside the pump chamber via the volume varying member, a detection means that detects the amount of displacement of the volume varying member, and a feedback means that regulates the pressure to be applied inside the pump chamber by means of the pressure application means prior to opening the at least one of the ports in order to perform feedback control of the amount of fluctuation detected by the detection means when the at least one port is to be opened.

In the aforementioned construction, in the event that the volume varying member fluctuates when opening the at least one port, it is thought that a pressure differential will occur between the upstream side and the downstream side of the open/close means, and an abrupt flow of liquid chemical will occur between the upstream side and the downstream side at opening. Then, the amount of fluctuation can be feedback controlled by regulating the pressure inside the pump chamber prior to opening of the open/close means. In this way, when the feedback control is reflected, the amount of fluctuation can be controlled as desired, and thus fluctuations in the liquid chemical can be suitably controlled when opening the open/close means.

Another aspect of the invention according to means 2 is the aspect according to means 1, wherein the feedback means may set the target value of the amount of fluctuation to zero.

It is thought that the position of the volume varying member will not fluctuate when opening the open/close means and that the liquid chemical will be placed into a stable state. In the aforementioned construction, by setting the target value of the amount of fluctuation to zero, fluctuation in the volume varying member that accompanies the opening of the open/close means can be suitably inhibited, and thus fluctuations in the liquid chemical can be suitably inhibited or avoided.

One aspect of the invention according to means 3 is the aspect according to means 1 or 2, wherein the open/close means is a means that electrically opens and closes the discharge port, and the feedback means performs feedback control of the amount of fluctuation detected by the detection means when the discharge port is to be opened.

With the aforementioned construction, liquid chemical can be supplied in a stable state because the amount of fluctuation of the volume varying member can be controlled when the discharge port is to be opened by means of feedback control.

Another aspect of the invention according to means 4 is the aspect according to means 3, further comprising a plurality of liquid chemical supply pumps, and wherein the discharge ports of the plurality of liquid chemical pumps are connected to a common liquid chemical supply port, and the system continuously supplies liquid chemical to the exterior via the liquid chemical supply port by duplicating liquid chemical intake and discharge intervals between the plurality of liquid chemical supply pumps.

In the aforementioned construction, liquid chemical will be continuously supplied to the exterior by duplicating the discharge interval and intake interval of the plurality of liquid chemical supply pumps. In this case, fluctuations in the liquid chemical can be restricted by feedback controlling the amount of fluctuation in the position of the volume varying member during the opening of the discharge port of each liquid chemical supply pump. Because of this, liquid chemical can be continuously supplied in a stable state. In particular, the flow rate of the liquid chemical supplied via the liquid chemical supply port can also be made constant with a high degree of precision by restricting fluctuations in the liquid chemical by means of the aforementioned feedback control.

Note that in a case where the plurality of liquid chemical supply pumps is two liquid chemical supply pumps, it is preferable that the liquid chemical be sequentially discharged from these liquid chemical supply pumps.

One aspect of the invention according to means 5 is the aspect according to means 3 or 4, further comprising a restriction means that restricts the amount of displacement of the volume varying member so that the volume inside the pump chamber is less than a maximum value during the intake of liquid chemical by expanding the volume inside the pump chamber by means of the displacement of the volume varying member.

When the pressure inside the pump chamber is lower than the pressure on the downstream side of the discharge port, a force will be added in a direction that causes the volume varying member to be displaced to enlarge the volume inside the pump chamber. However, when the volume of the pump chamber reaches a maximum prior to the opening of the discharge port, the position of the volume varying member will not change. Because of this, the detection means cannot detect the fact that the pressure inside the pump chamber is lower than the pressure on the downstream side of the discharge port. In this case, although a reverse flow of liquid chemical into the pump chamber will not occur regardless of opening the discharge port, control cannot be performed such that the pressure differential between the upstream side and the downstream side of the discharge port is limited, and thus when the volume varying member is displaced after the discharge port is opened, a time gap occurs until the actual displacement begins, and the ability to control the liquid chemical is reduced. In contrast to this, with the aforementioned construction, by restricting the displacement of the volume varying member during the intake process so that the volume inside the pump chamber prior to the opening of the discharge port is less than the maximum level, the detection means can suitably detect the fact that the pressure inside the pump chamber is lower than the pressure on the downstream side of the discharge port.

Another aspect of the invention according to means 6 is the aspect according to any of means 1 to 5, wherein the pressure application means is a means to apply pressure inside the pump chamber by means of gas pressure inside a pressure operation chamber divided from the pump chamber via the volume varying member.

With the aforementioned construction, pressure will be applied inside the pump chamber by means of air pressure inside the pressure operation chamber. Because of this, the pressure application means can be appropriately constructed.

One aspect of the invention according to means 7 is the aspect according to means 6, further comprising a setting means that sets a target value for the displacement speed of the volume varying member during the discharge of liquid chemical, a calculation means that calculates the actual displacement speed of the volume varying member based upon the detection results of the detection means, and means that adjusts the pressure inside the pressure operation chamber in order to feedback control the actual displacement speed to the target value.

With the aforementioned construction, the displacement speed of the volume varying means will be feedback controlled to a target value, and thus the amount of discharge can be controlled with a high degree of precision in each discharge process.

Another aspect of the invention according to means 8 is the aspect according to any one of means 1 to 7, wherein the volume varying member comprises a bellows capable of expansion and contraction in an axial direction, and the detection means will detect the amount of expansion and contraction of the bellows as the amount of displacement.

The bellows will expand and contract in the axial direction thereof, and moreover, the change in volume of the pump chamber with respect to the amount of expansion and contraction of the bellows will be approximately linear. Because of this, the amount of liquid chemical drawn in and discharged can be easily controlled with a high degree of precision by adjusting the amount of expansion and contraction of the bellows.

One aspect of the invention according to means 9 is a liquid chemical supply control device that controls the amount of liquid chemical to be supplied based upon the detection results of the detection means. The liquid chemical supply control device is provided in a liquid chemical supply device comprising a liquid chemical supply pump that discharges, via a discharge port, liquid chemical drawn in from an intake port due to a volume change inside a pump chamber that accompanies the displacement of a volume varying member, an open/close means that electrically opens and closes at least one of the discharge port and the intake port, a pressure application means that applies pressure inside the pump chamber via the volume varying member, and a detection means that detects the amount of displacement of the volume varying member. The liquid chemical supply control device comprises a feedback means that regulates the pressure to be applied inside the pump chamber by means of the pressure application means prior to opening the at least one of the ports in order to perform feedback control of the amount of fluctuation detected by the detection means when the at least one port is to be opened.

In the aforementioned construction, in the event that the volume varying member fluctuates when opening the at least one port, it is thought that a pressure differential will occur between the upstream side and the downstream side of the open/close means, and an abrupt flow of liquid chemical will occur between the upstream side and the downstream side at opening. Then, the amount of fluctuation can be feedback controlled by regulating the pressure inside the pump chamber prior to opening by the open/close means. In this way, when the feedback control is reflected, the amount of fluctuation can be controlled as desired, and thus fluctuations in the liquid chemical can be suitably controlled when opening the open/close means.

Another aspect of the invention according to means 10 is the aspect according to means 9, wherein the feedback means sets the target value of the amount of fluctuation to zero.

It is thought that the position of the volume varying member will not fluctuate during opening of the open/close means and the liquid chemical will be placed into a stable state. In the aforementioned construction, by setting the target value of the amount of fluctuation to zero, fluctuation in the volume varying member that accompanies the opening of the open/close means can be suitably inhibited, and thus fluctuations in the liquid chemical can be suitably inhibited or avoided.

One aspect of the invention according to means 11 is the aspect according to means 9 or 10, wherein the open/close means is a means that electrically opens and closes the discharge port, and the feedback means performs feedback control of the amount of fluctuation detected by the detection means when the discharge port is opened.

With the aforementioned construction, liquid chemical can be supplied in a stable state because the amount of fluctuation of the volume varying member can be controlled when the discharge port is to be opened by means of feedback control.

Another aspect of the invention according to means 12 is the aspect according to means 11, wherein the liquid chemical supply control device further comprises a plurality of liquid chemical supply pumps, the discharge ports of the plurality of liquid chemical pumps are connected to a common liquid chemical supply port, and the liquid chemical supply control device continuously supplies liquid chemical to the exterior via the liquid chemical supply port by means of control to duplicate liquid chemical intake and discharge intervals between the plurality of liquid chemical supply pumps.

In the aforementioned construction, liquid chemical will be continuously supplied to the exterior by duplicating the discharge interval and intake interval of the plurality of liquid chemical supply pumps. In this case, fluctuations in the liquid chemical can be restricted by feedback controlling the amount of fluctuation of the volume varying member during the opening of the discharge port of each liquid chemical supply pump. Because of this, liquid chemical can be continuously supplied in a stable state. In particular, the flow rate of the liquid chemical supplied via the liquid chemical supply port can also be made constant with a high degree of precision by restricting fluctuations in the liquid chemical by means of the aforementioned feedback control.

Note that in a case where the plurality of liquid chemical supply pumps is two liquid chemical supply pumps, it is preferable that the liquid chemical be sequentially discharged from these liquid chemical supply pumps.

One aspect of the invention according to means 13 is the aspect according to means 11 or 12, further comprising a restriction means that restricts the amount of displacement of the volume varying member so that the volume inside the pump chamber is less than a maximum value during the intake of liquid chemical by expanding the volume inside the pump chamber by means of the displacement of the volume varying member.

When the pressure inside the pump chamber is lower than the pressure on the downstream side of the discharge port, a force will be added in a direction that causes the volume varying member to be displaced to enlarge the volume inside the pump chamber. However, when the volume of the pump chamber reaches a maximum value prior to the opening of the discharge port, the position of the volume varying member will not change. Because of this, the detection means cannot detect the fact that the pressure inside the pump chamber is lower than the pressure on the downstream side of the discharge port. In this case, although a reverse flow of liquid chemical into the pump chamber will not occur regardless of opening the discharge port, control cannot be performed such that the pressure differential between the upstream side and the downstream side of the discharge port is limited, and thus when the volume varying member is displaced after the discharge port is opened, a time gap occurs until the actual displacement begins, and the ability to control the liquid chemical is reduced. In contrast to this, with the aforementioned construction, by restricting the displacement of the volume varying member during the intake process so that the volume inside the pump chamber prior to the opening of the discharge port is less than the maximum level, the detection means can suitably detect the fact that the pressure inside the pump chamber is lower than the pressure on the downstream side of the discharge port.

Another aspect of the invention according to means 14 is the aspect of the disclosure of means 13, wherein the pressure application means is a means to adjust the air pressure inside a pressure operation chamber that is divided from the pump chamber via the volume varying member, and further comprising a setting means that sets a target value for the displacement speed of the volume varying member, a calculation means that calculates the actual displacement speed of the volume varying member based upon the detection results of the detection means, and a means that adjusts the pressure inside the pressure operation chamber in order to feedback control the actual displacement speed to the target value.

With the aforementioned construction, the displacement speed of the volume varying means will be feedback controlled to a target value, and thus the amount of discharge can be controlled with a high degree of precision in each discharge process.

The above and other objects, features, and advantages of the present invention will be apparent from the following description when taken in conjunction with the accompanying drawings which illustrate preferred embodiments of the present invention by way of example.

BRIEF DESCRIPTION OF THE DRAWINGS

[FIG. 2] A drawing that shows a mode of drawing in and discharging liquid chemical by means of a liquid chemical supply pump according to the same embodiment.

DESCRIPTION OF THE PREFERRED EMBODIMENTS

First Embodiment

A first embodiment of a liquid chemical supply system according to the present invention that is employed in the semiconductor manufacturing process will be described with reference to the drawings.

Figure 1:
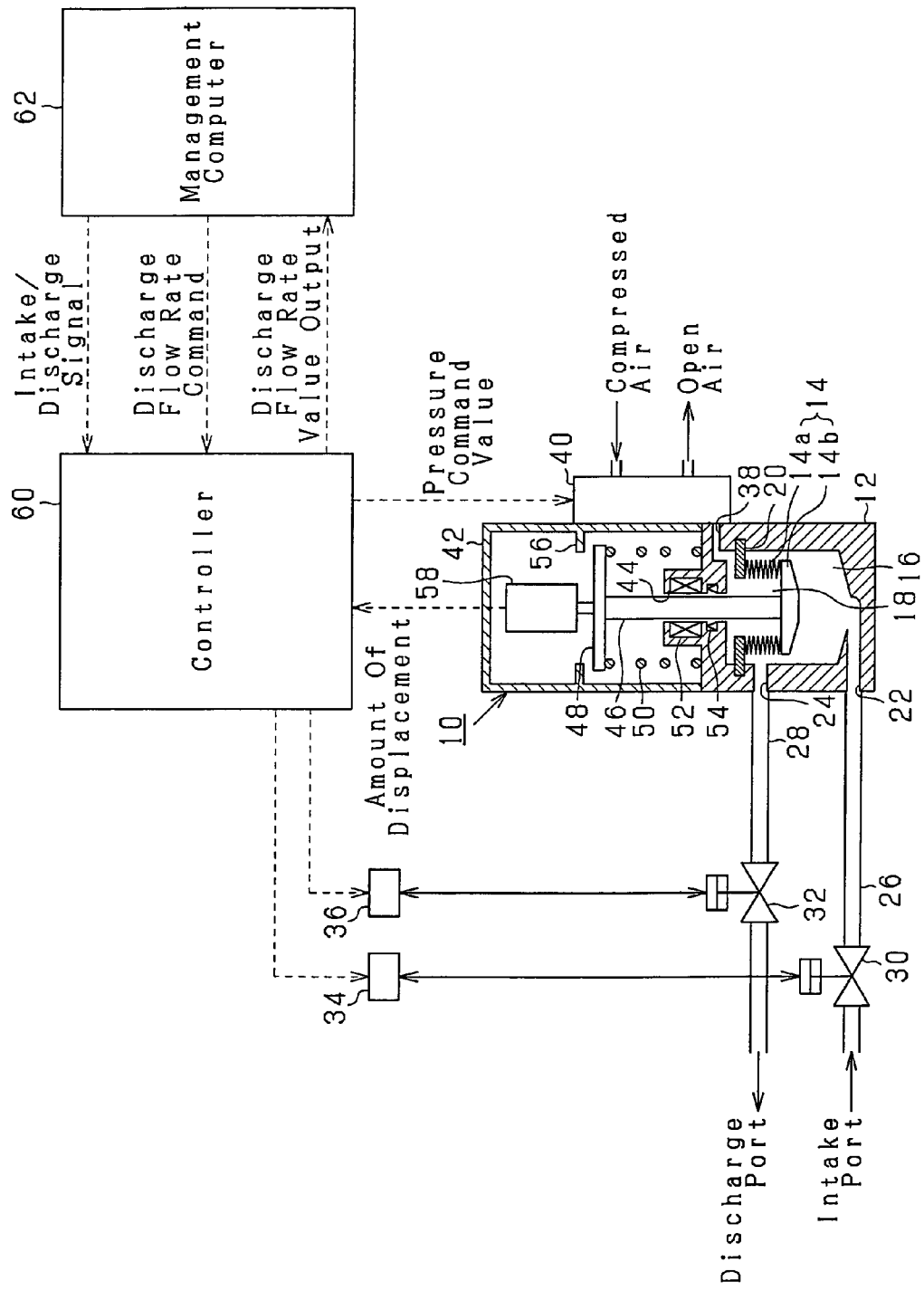
[FIG. 1] A drawing that shows the construction of a liquid chemical supply system according to a first embodiment.

The liquid chemical supply system according to the present embodiment is shown in FIG. 1.

A liquid chemical supply pump 10 will perform the intake and discharge of liquid chemical. A bellows type partition member 14 (a volume varying member) is housed inside a pump housing 12 in the liquid chemical pump 10, and a pump chamber 16 is divided from a pressure operation chamber 18 by means of this bellows type partition member 14. The bellows type partition member 14 has a bellows 14a that can expand and contract in the axial direction, and a partition plate 14b that is installed on one end (the lower end in the drawing) of the bellows 14a, with the other end of the bellows 14a (the upper end in the drawing) being fixed to a annular fixing plate 20. The partition plate 14b will move due to the expansion and contraction of the bellows 14a, and thus the volume of the pump chamber 16 and the pressure operation chamber 18 will each change. In this case, because the total volume of the pump chamber 16 and the pressure operation chamber 18 has no relationship with the expansion and contraction of the bellows 14a and does not vary, the increase in volume of, for example, the pump chamber 16 corresponds to the reduction in volume of the pressure operation chamber 18 (of course, the increase and reduction is the same in the opposite case as well).

An intake port 22 and a discharge port 24 that communicates with the pump chamber 16 are formed in the pump housing 12, an intake tube 26 is connected to the intake port 22, and a discharge tube 28 is connected to the discharge port 24. An intake side valve 30 is arranged on the intake tube 26, and a discharge side valve 32 is arranged on the discharge tube 28. The intake side valve 30 and the discharge side valve 32 will each open and close in response to the conductive state of a solenoid 34 and a solenoid 36. For example, the intake side valve 30 and the discharge side valve 32 are constructed with air operated valves that are opened and closed by means of air pressure, the air pressure that operates the intake side valve 30 and the discharge side valve 32 will be adjusted in response to the conductive state of the solenoids 34 and 36, and the intake side valve 30 and the discharge side valve 32 will be opened and closed in accordance therewith.

The intake tube 26 forms a liquid chemical supply passage for supplying liquid chemical such as resist fluid or the like to the pump chamber 16, and liquid chemical that is stored inside a liquid chemical bottle not shown in the drawings (a liquid chemical storage container), or liquid chemical that is to be supplied by a liquid chemical tube in a facility, will be supplied to the pump chamber 16 via the intake tube 26. In this way, the liquid chemical inside the pump chamber 16 will be replenished. In addition, the discharge tube 28 forms a liquid chemical discharge passage for discharging the liquid chemical that was replenished inside the pump chamber 16, and the liquid chemical to be discharged from the pump chamber 16 will be supplied to a liquid chemical discharge nozzle (not shown in the drawings) via the discharge tube 28. The liquid chemical discharge nozzle is arranged such that liquid chemical will be directed downward and dripped onto the central position of a semiconductor wafer mounted on a rotating plate or the like, and the application of liquid chemical to a wafer surface will be performed by dripping a sufficient amount of liquid chemical onto a semiconductor wafer from the liquid chemical discharge nozzle.

An air intake/discharge port 38 that communicates with the pressure operation chamber 18 is formed in the same pump housing 12, and a electropneumatic regulator 40 is connected to the air intake/discharge port 38. The electropneumatic regulator 40 forms a pressure application means that applies pressure inside the pump chamber 16 by adjusting the air pressure inside the pressure operation chamber 18, and will switch between a compressed air inflow state in which compressed air is caused to flow into the pressure operation chamber 18, and an open air state in which the air inside the pressure operation chamber 18 is allowed to flow out to the exterior of the electropneumatic regulator 40, by means of the switching operation of a solenoid type switching valve installed in the electropneumatic regulator 40.

A case 42 is attached to the pump housing 12, and a long thin cylindrical rod 46 slidably extends through a through hole 44 formed in the pump housing 12 so as to project out on the case 42 side. In other words, one end of the rod 46 projects into the pressure operation chamber 18, and the other end of the rod 46 projects into the interior space surrounded by the case 42. The partition plate 14b of the bellows type partition member 14 is coupled with the end of the rod 46 on the pressure operation chamber 18 side, and the rod 46 will reciprocate vertically in the drawing in accordance with the movement of the partition plate 14b (i.e., the extension and contraction of the bellows 14a).

In addition, a spring receiving plate 48 is coupled with the end of the rod 46 on the case 42 side, and a coil spring 50 is interposed between the spring receiving plate 48 and the surface of the outer wall of the pump housing 12. The rod 46 will constantly apply upward force in the drawings due to the elastic force of the coil spring 50. The coil spring 50 corresponds to an urging means for urging the bellows type partition member 14 in a direction that opposes the air pressure inside the pressure operation chamber 18.

Note that the rod 46 is reciprocally held by a linear bearing 52, and is sealed by an axial seal 54 between the case 42 and the pressure operation chamber 18.

Due to the aforementioned construction, when compressed air has not been introduced into the pressure operation chamber 18 (the open air state), the bellows 14a of the bellows type partition member 14 can contract until the spring receiving plate 48 comes into contact with the stopper 56 due to the elastic force of the coil spring 50. Then, the volume of the pump chamber 16 will increase in accordance with the contraction of the bellows 14a. At this point, as shown in FIG. 2(a), liquid chemical will be taken into the pump chamber 16 via the intake tube 26 by opening the intake side valve 30 and closing the discharge side valve 32. In contrast, in the compressed air inflow state, compressed air supplied from an air compressor not shown in the drawings will be introduced into the pressure operation chamber 18 via the electropneumatic regulator 40 shown previously in FIG. 1 and the air intake/discharge port 38, and the bellows 14a will extend in accordance with the balance between the air pressure inside the pressure operation chamber 18 and the elastic force of the coil spring 50 in order to reduce the volume of the pump chamber 16. At this point, as shown in FIG. 2(b), liquid chemical that has been replenished inside the pump chamber 16 will be discharged via the discharge tube 28 by closing the intake side valve 30 and opening the discharge side valve 32.

A displacement sensor 58 for detecting the position and amount of displacement of the rod 46 (i.e., the position and amount of contraction of the bellows 14*a*) is arranged inside the case 42 previously shown in FIG. 2.

A controller 60 is a dedicated control device that will control the supply of liquid chemical by means of the liquid chemical supply pump 10 in response to a command from a management computer 62 that integrates and manages the overall system. In other words, discharge and intake command signals, command signals regarding the discharge flow rate, as well as the amount of displacement detected by the aforementioned displacement sensor 58, will be introduced into the controller 60 from the aforementioned management computer 62. Then, based on these, the solenoids 34 and 36 will be placed in a conductive or non-conductive state in order to perform an open/close operation with the intake side valve 30 and the discharge side valve 32, and a pressure command signal will be output to the electropneumatic regulator 40 in order to operate the electropneumatic regulator 40. Furthermore, the controller 60 will calculate a discharge flow rate value based upon the amount of displacement detected by the displacement sensor 58, and will output that calculated value to the management computer 62 or the like.

Figure 3:
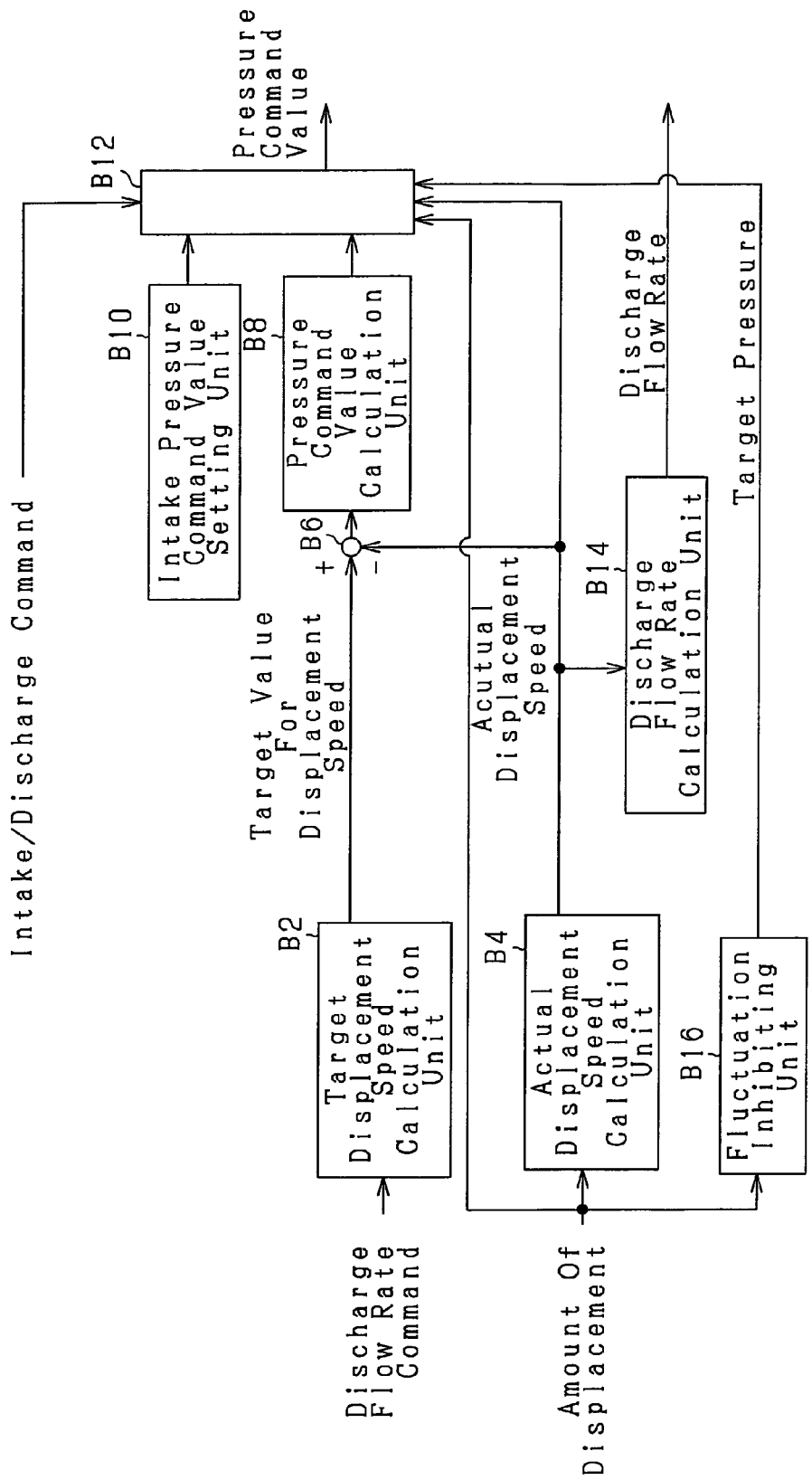
[FIG. 3] A block diagram showing the process of drawing in and discharging liquid chemical according to the same embodiment.

Next, FIG. 3 will be employed to describe the process of liquid chemical supply control by the controller 60.

Figure 4:
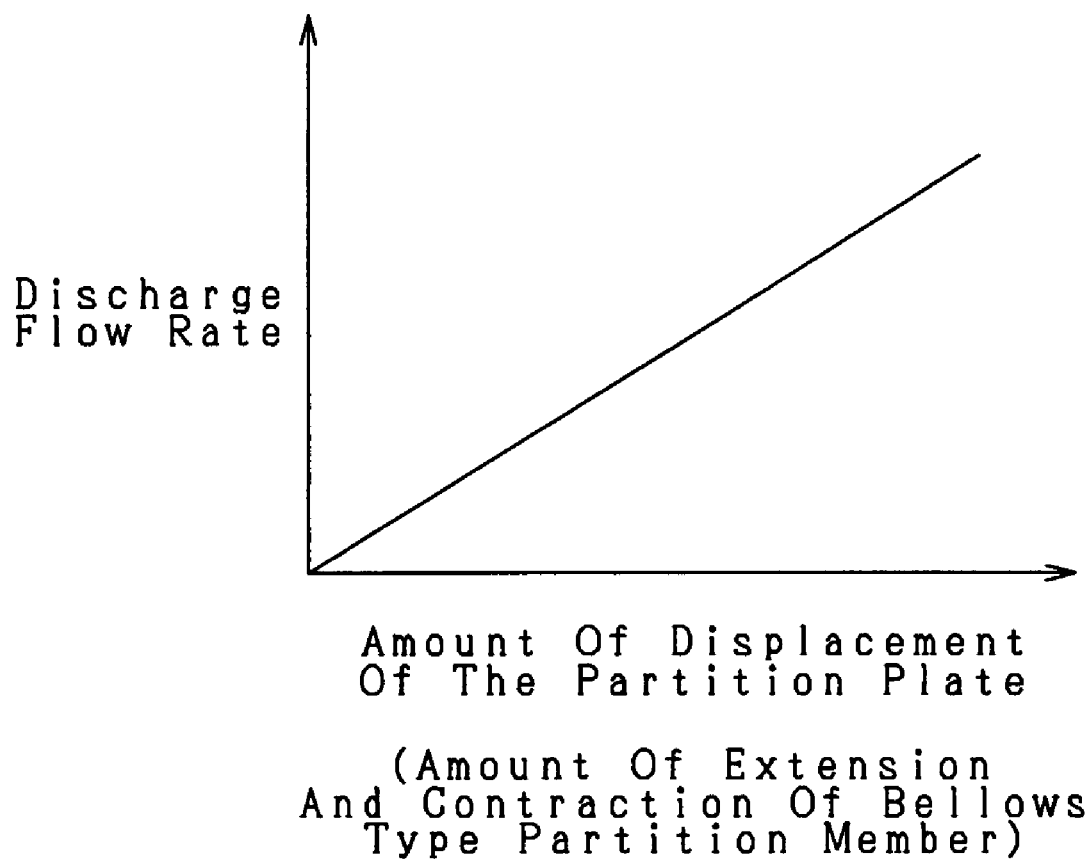
[FIG. 4] A drawing that shows the relationship between the amount of displacement of a bellows type partition member according to the same embodiment and the amount of discharge.

A target displacement speed calculation unit B2 will calculate a target value for the displacement speed of the bellows type partition member 14, based upon the discharge flow rate command value from the aforementioned management computer 62. Here, a target value of the displacement speed will be again performed based upon pump discharge characteristics that represent the relationship between the discharge flow rate and the amount of displacement. More specifically, the relationship between the amount of displacement of the partition plate 14*b* and the amount of discharge of the liquid chemical supply pump 10 is shown in FIG. 4. According to FIG. 4, the amount of pump discharge with respect to the amount of movement of the partition plate 14*b* is approximately linear, and this relationship is employed in order to calculate the displacement speed of the bellows type partition member 14.

An actual displacement speed calculation unit B4 will calculate the actual displacement speed of the bellows type partition member 14 based upon the temporal differentiation with the amount of displacement detected by the displacement sensor 58. A deviation calculation unit B6 will calculate the difference between the target displacement speed and the actual displacement speed. A pressure command value calculation unit B8 will calculate command values for the pressure inside the pressure operation chamber 18, which are operation quantities for performing feedback control of the actual displacement speed to the target displacement speed.

An intake pressure command value setting unit B10 will set the pressure command value during intake of the liquid chemical. A selector B12 will select either of the outputs of the pressure command value calculation unit B8 or the intake pressure command value setting unit B10 in response to an intake command and a discharge command from the aforementioned management computer 62. The output of the selector B12 is the final pressure command value. In other words, in the present embodiment, the displacement speed of the bellows type partition member 14 will be feedback controlled during the discharge of liquid chemical, and the displacement speed of the bellows type partition member 14 will be open loop controlled during the intake of liquid chemical. Note that with the selector B12, the pressure command values will be adjusted so as to make the actual displacement speed zero so that intake will be stopped when the positions of the bellows 14*a* reaches predetermined values during the intake process based on the amount of displacement detected by the displacement sensor 58.

A discharge flow rate calculation unit B14 will convert the actual displacement speed to a discharge flow rate, and will output that result to the management computer 62 as a discharge flow rate value. Note that the relationship shown previously in FIG. 4 will be employed during this conversion.

As noted above, in the present embodiment, the amount of discharge can be controlled with a high degree of precision by performing feedback control of the displacement speed of the rod 46 during liquid chemical discharge to the target displacement speed.

It is noted that if a pressure differential occurs between the upstream and downstream sides of the discharge side valve 32 when the discharge side valve 32 is opened in order to discharge liquid chemical, an abrupt flow of liquid chemical may occur via the discharge side valve 32 by opening the discharge side valve 32. This will be described in detail below.

Figure 5:
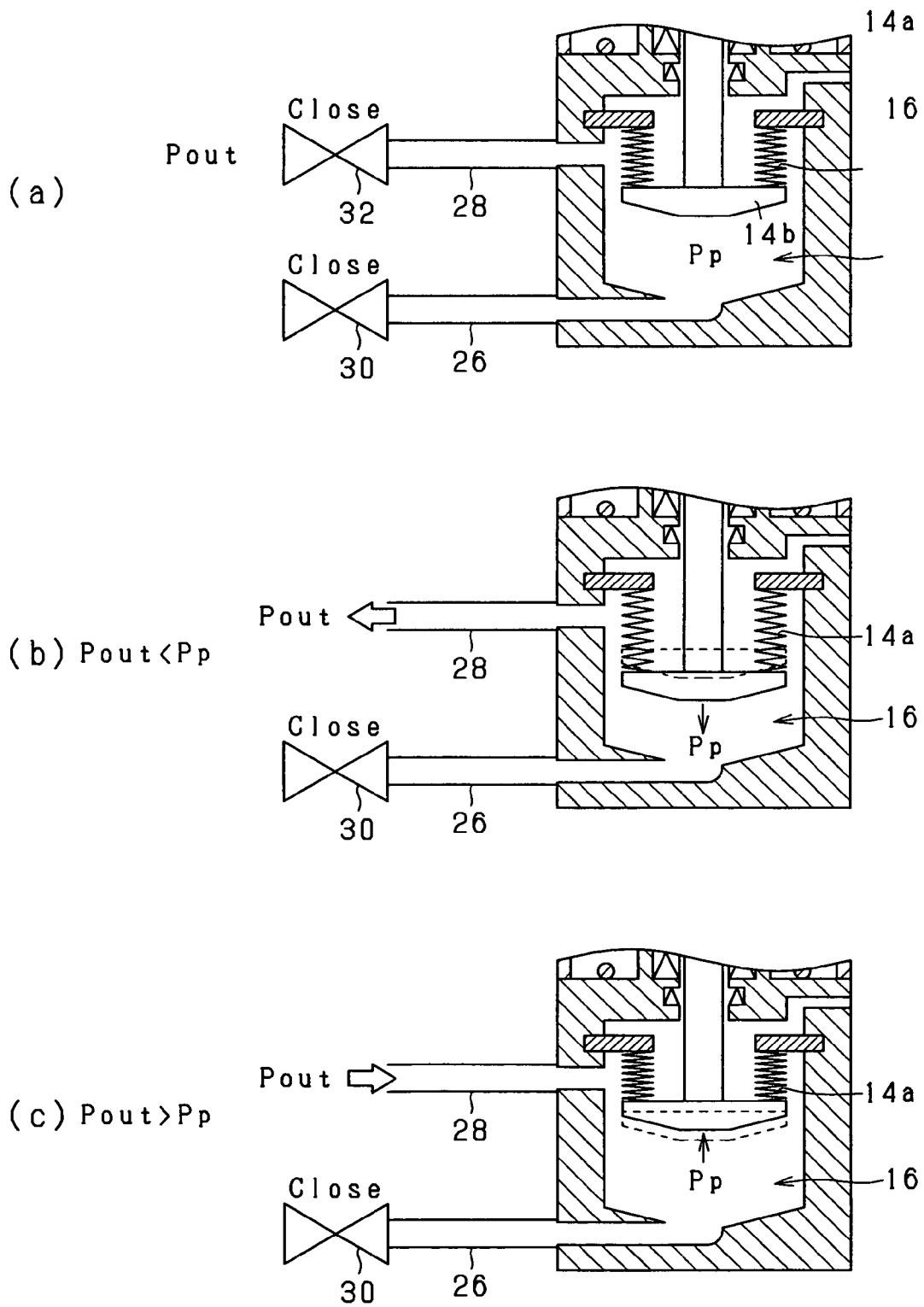
[FIG. 5] A drawing that explains the problems that accompany the opening of a discharge side valve in the same embodiment.
Figure 6:
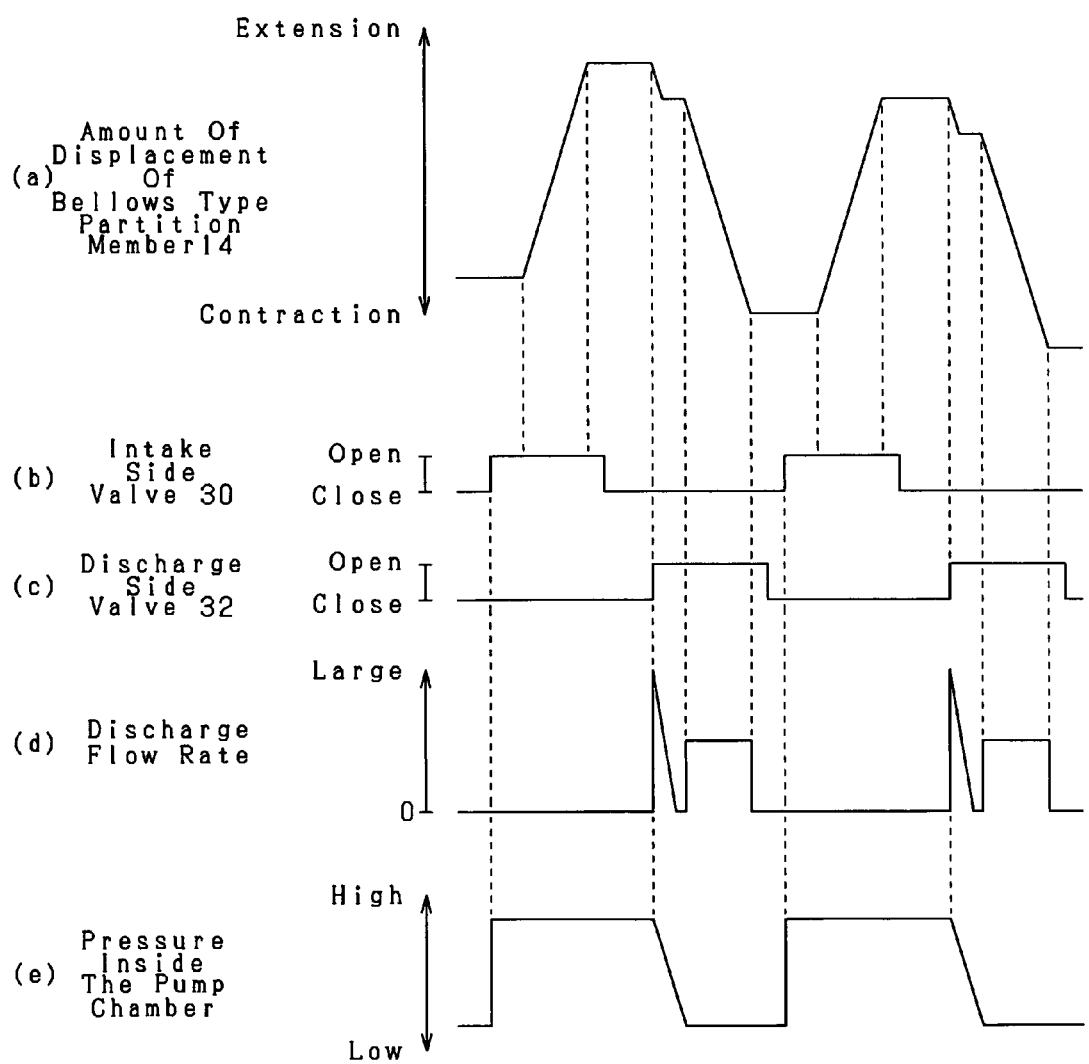
[FIG. 6] A time chart that explains the problems that accompany the opening of a discharge side valve in the same embodiment.

FIG. 5(*a*) shows the intake of liquid chemical into the pump chamber 16 is complete, and the intake side valve 30 and the discharge side valve 32 have been closed. Note that in FIG. 5(*a*), the pressure inside the pump chamber 16 is pressure Pp, and the pressure on the downstream side of the discharge side valve 32 is pressure Pout. Here, in the event that the pressure Pp inside the pump chamber 16 is higher than the pressure Pout on the downstream side of the discharge side valve 32, as shown in FIG. 5(*b*), liquid chemical inside the pump chamber 16 will abruptly flow out to the exterior thereof by opening the discharge side valve 32. FIG. 6 shows the change in the liquid chemical supply flow rate by the liquid chemical supply pump 10 in the event that the pressure Pp of the discharge side valve 32 is higher than the downstream side pressure Pout of the discharge side valve 32. More specifically, FIG. 6(*a*) shows the change in the amount of displacement of the bellows type partition member 14 (the amount of displacement of the rod 46), FIG. 6(*b*) shows the change in the open/close state of the intake side valve 30, FIG. 6(*c*) shows the change in the open/close state of the discharge side valve 32, FIG. 6(*d*) shows the change in the discharge flow rate of liquid chemical from the liquid chemical supply pump 10, and FIG. 6(*e*) shows the change in the pressure inside the pump chamber 16.

As shown in the drawings, in the event that the upstream side pressure of the intake side valve 30 is higher than inside the pump chamber 16, the pressure inside the pump chamber 16 will rise in association with the opening of the intake side valve 30. Then, in association with the opening of the discharge side valve 32, the pressure inside the pump chamber 16 will decrease because the liquid chemical inside the pump chamber 16 will abruptly flow out to the exterior thereof. Then, a fixed flow rate of liquid chemical will flow out in association with the displacement of the extended side of the bellows 14*a*.

Figure 7:
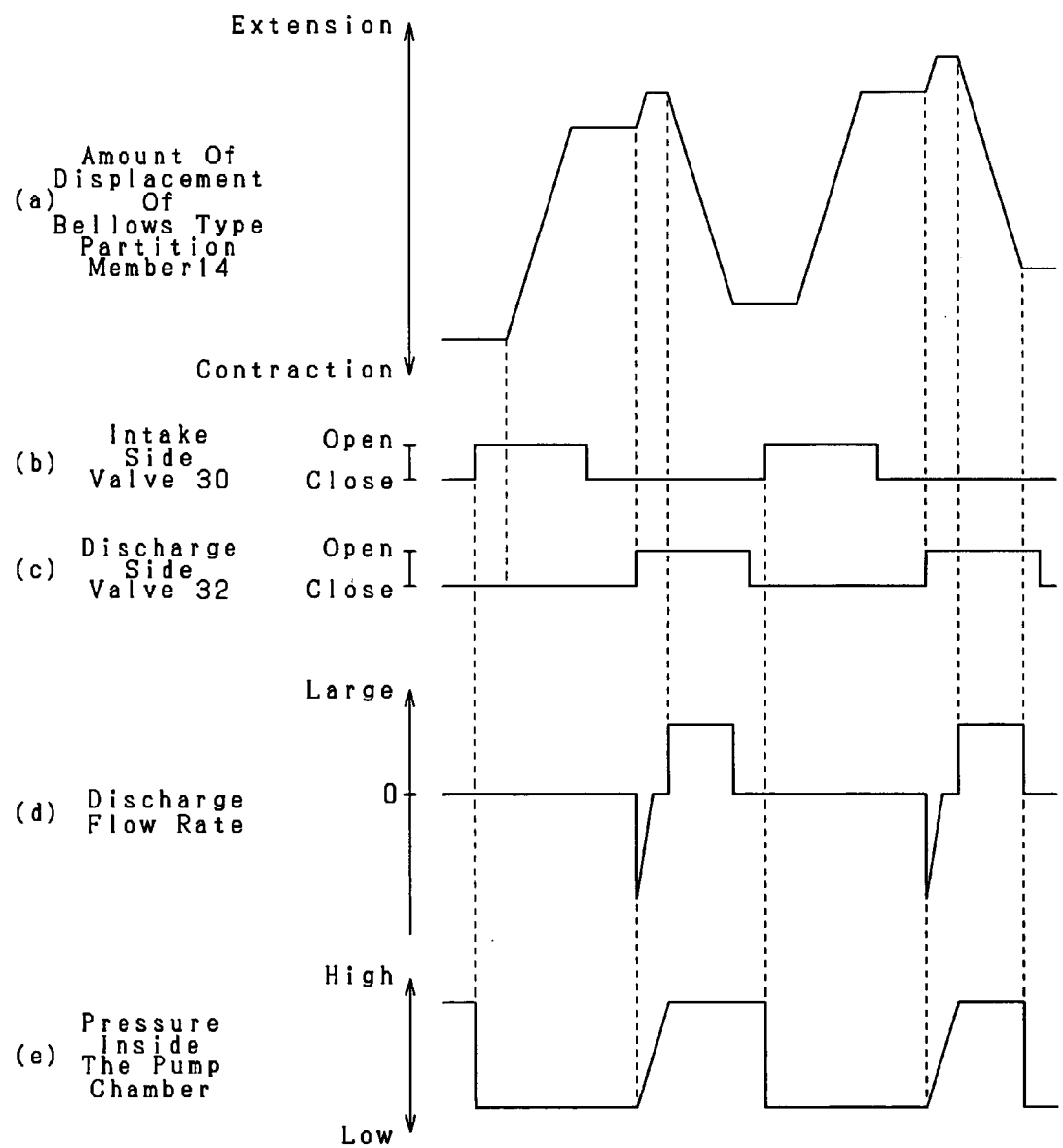
[FIG. 7] Another time chart that explains the problems that accompany the opening of a discharge side valve in the same embodiment.

In contrast, in the event that the pressure Pp inside the pump chamber 16 is lower than the pressure Pout on the downstream side of the discharge side valve 32, as shown in FIG. 5(*c*), liquid chemical will abruptly flow into the pump chamber 16 by opening the discharge side valve 32. FIG. 7 shows the change in the liquid chemical supply flow rate by the liquid chemical supply pump 10 in the event that the pressure Pp of the discharge side valve 32 is lower than the downstream side pressure Pout of the discharge side valve 32. Note that FIGS. 7(*a*) to 7(*e*) correspond to the previous FIGS. 6(*a*) to 6(*e*).

As shown in the drawings, in the event that the pressure on the upstream side of the intake side valve 30 is lower than that inside the pump chamber 16, the pressure inside the pump chamber 16 will decrease in association with the opening of the intake side valve 30. Then, in association with the opening of the discharge side valve 32, the pressure inside the pump chamber 16 will rise because the liquid chemical will abruptly flow into the pump chamber 16. Then, a fixed flow rate of liquid chemical will flow out in association with the extension of the bellows 14a.

Thus, in the event that a difference occurs between the pressure Pp inside the pump chamber 16 and the exterior pressure Pout during the opening of the discharge side valve 32, an abrupt flow of liquid chemical may occur in association with the opening of the discharge side valve 32. Because of this, when the liquid chemical supply pump 10 is employed to discharge liquid chemical to the exterior, it may be difficult to control the supply flow rate with a high degree of precision.

One method of resolving this situation might be to provide a pressure sensor both inside the pump chamber 16 and on the downstream side of the discharge side valve 32, and adjusting the pressure inside the pump chamber 16 so as to match the detection values of the two pressure sensors prior to opening the discharge side valve 32. However, this will not only cause an increase in the number of parts in the liquid chemical supply system, but the size of the system will be unavoidably increased due to the provision of the pressure sensors. Furthermore, deterioration of the pressure sensors will also become a problem because the pressure sensors will be immersed in liquid chemical.

Accordingly, in the present embodiment, the displacement sensor 58 detects the amount of displacement of the position of the bellows type partition member 14 that accompanies the opening of the discharge side valve 32, and in order that the amount of fluctuation will be feedback controlled, the pressure inside the pump chamber 16 will be regulated. In other words, as previously shown in FIG. 5(b) and FIG. 5(c), in the event that there is a differential between pressure Pp inside the pump chamber 16 and the exterior pressure Pout, the position of the bellows type partition member 14 will fluctuate when an abrupt flow of liquid chemical occurs in association with the opening of the discharge side valve 32. Because of this, the amount of fluctuation will become a parameter that correlates with the pressure differential between the pressure Pp inside the pump chamber 16 and the exterior pressure Pout. Thus, by detecting the amount of fluctuation in the position of the bellows type partition member 14, the pressure differential between the pressure Pp inside the pump chamber 16 and the external pressure Pout can be indirectly detected. Then, by regulating the pressure inside the pump chamber 16 so as to reduce this fluctuation, the abrupt flow of liquid chemical that accompanies the opening of the discharge side valve 32 can be inhibited or avoided.

Specifically, although the pressure inside the pump chamber 16 is determined in response to the pressure inside the pressure operation chamber 18, the pressure inside the pump chamber 16 cannot be directly regulated due to the presence of the elastic force of the bellows 14a, the coil spring 50, etc. Accordingly, the pressure inside the pump chamber 16 will be indirectly regulated by adjusting the air pressure inside the pressure operation chamber 18.

In order that this process will be performed, as previously shown in FIG. 3, the controller 60 comprises a fluctuation inhibiting unit B16. The fluctuation inhibiting unit B16 will calculate a target pressure for reducing the amount of fluctuation in the position detected by the displacement sensor 58. In this way, after completing the intake process, the target pressure calculated by the fluctuation inhibiting unit B16 will be used as a pressure command value by the selector B12.

Figure 8:
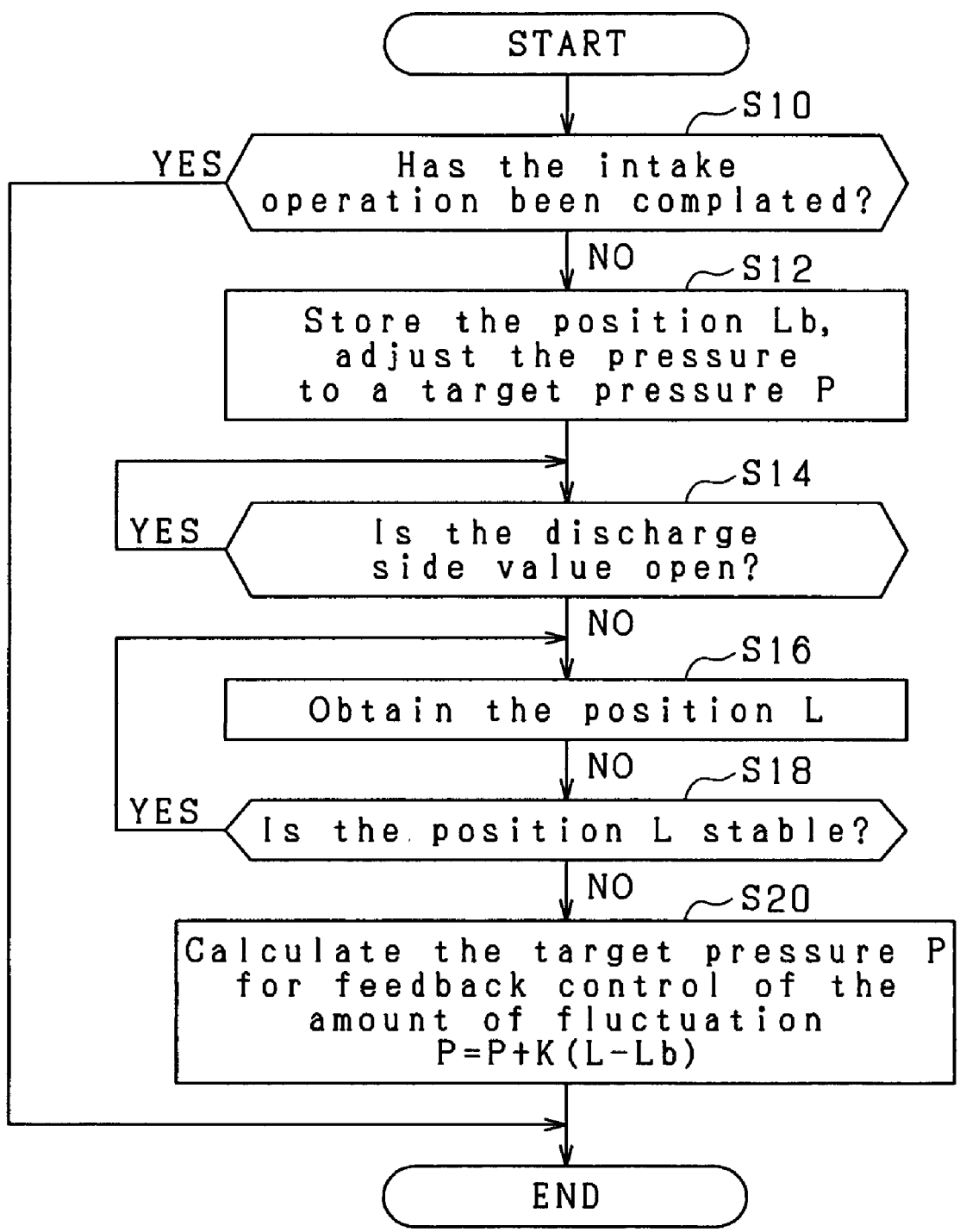
[FIG. 8] A flow diagram that shows the process sequence of feedback control of fluctuations in the bellows type partition member that accompany the opening of the discharge side valve according to the same embodiment.

FIG. 8 shows the process sequence in the fluctuation feedback control according to the present embodiment. This process will be repeatedly performed at, for example, predetermined intervals by the controller 60.

In this series of processes, firstly in step S10, it will be determined whether or not the intake operation has been completed. Then, if the intake operation has been determined to be completed, in step S12, the position Lb of the bellows type partition member 14 at that point will be stored, and the pressure inside the pressure operation chamber 18 will be adjusted to a target pressure described below. If the process of step S12 is complete, the process will stand by until the discharge side valve 32 is opened (step S14). Then, if the discharge side valve 32 is opened, the position L detected by the displacement sensor 58 will be obtained. Next, in step S18, it will be determined whether or not the position L is stable. Here, it may be determined whether or not the amount of change in the position L is below a threshold value in order to determine whether the position L is stable. Here, the amount of change in the position L may be fixed by means of the difference between a previous sampling value and a current sampling value. In addition, instead of this, a process that inhibits the impact of noise on the detected sampling values may be performed, for example, the difference in the average value of a plurality of sampling values may be taken.

Then, the process will proceed to step S20 if the position L is determined to be stable in step S18. In step S20, feedback control of the amount of fluctuation in the position will be performed. Here, the amount of fluctuation will be fixed by the difference "L−Lb" between the position Lb stored in step S12 and the position L that was determined to be stable in S18. Then, in order that integral control that sets the target value of the amount of fluctuation to "0" will be performed, the target value for the pressure inside the pressure operation chamber 18 (target pressure P) will be updated. In other words, integral gain K and the previous target pressure P (n−1) will be employed, and the current target pressure P(n) will be set to the following value.

$$P(n)=P(n-1)+K\times(L-Lb)$$

Figure 9:
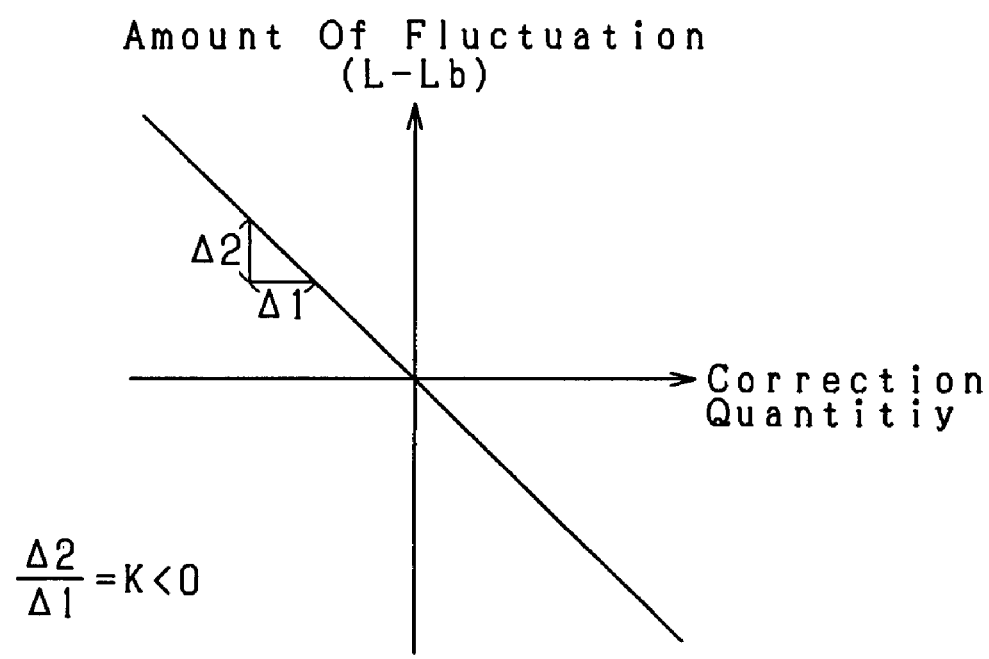
[FIG. 9] A drawing that shows a mode of calculating a correction amount in the aforementioned feedback control.

In this way, as shown in FIG. 9, the bigger the absolute value of the fluctuation amount "L−Lb", the more the target pressure P will be corrected by a correction quantity "K×(L−Lb)". Note that in the present embodiment, the more the bellows 14a extends, the more the position L is set so as to be a positive value. This means that when the amount of fluctuation "L−Lb" is positive, the bellows 14a has extended in association with the opening of the discharge side valve 32. In other words, this means that the pressure Pp inside the pump chamber 16 is higher than the exterior pressure Pout. Because of this, the target pressure P will be corrected downward in this case. From this point of view, the integral gain K is a negative value.

Figure 10:
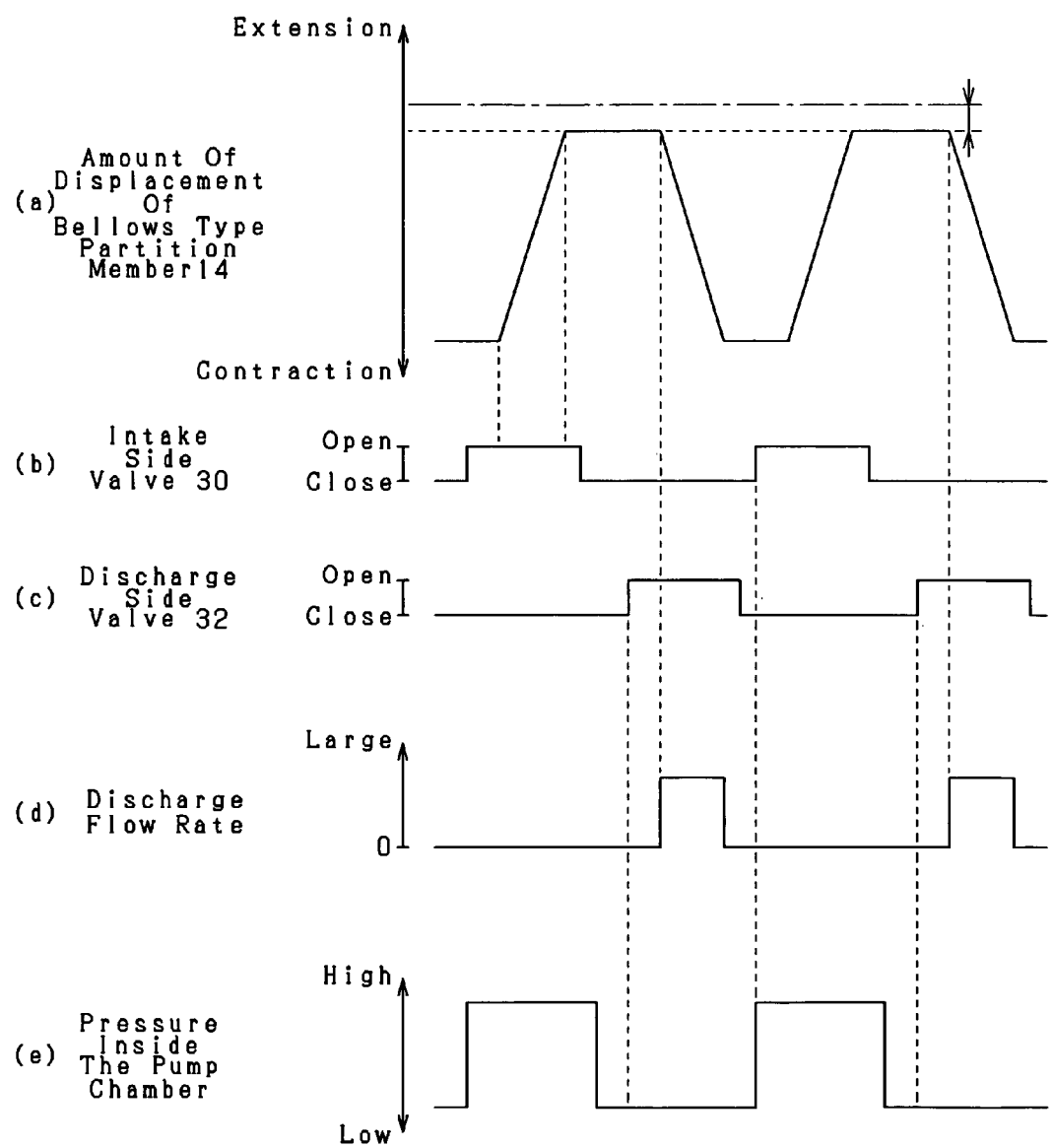
[FIG. 10] A time chart showing a mode of controlling the supply of liquid chemical after the aforementioned feedback control was reflected.

FIG. 10 shows the change in the flow rate of the liquid chemical supplied by the liquid chemical supply pump 10 when the aforementioned feedback control is reflected (in other words, when the target pressure P has become a constant value) in a state in which the pressure of the liquid chemical taken in is higher than the external pressure Pout of the discharge side valve 32, and Note that FIGS. 10(a) to 10(e) correspond to the previous FIGS. 6(a) to 6(e).

As shown in the drawings, by equalizing the pressure inside the pump chamber 16 with the external pressure Pout prior to opening the discharge side valve 32, liquid chemical will not abruptly flow when opening the discharge side valve 32. Because of this, the flow rate of the liquid chemical supplied by the liquid chemical supply pump 10 can be controlled with a high degree of precision.

Note that in the present embodiment as shown in the drawings, the intake process will stop prior to the position of the bellows type partition member 14 reaching the lower limit value (the value that will maximize the volume of the pump chamber 16) determined by the stopper 56 previously shown in FIG. 1. In this way, when the pressure Pp inside the pump chamber 16 prior to opening the discharge side valve 32 is smaller than the external pressure Pout, the bellows 14a will be contracted in association with the opening of the discharge side valve 32, and thus the fact that the pressure Pp inside the pump chamber 16 is smaller than the external pressure Pout can be detected. This setting will be achieved by providing logic inside the selector B12 previously shown in FIG. 3 in order to stop the intake process prior to the bellows 14a reaching the aforementioned lower limit value. In contrast to this, if the bellows type partition member 14 is contracted up to the lower limit value and the pressure Pp inside the pump chamber 16 prior to opening the discharge side valve 32 is smaller than the external pressure Pout, control cannot be performed in order to reduce the differential between the pressure Pout on the downstream side of the discharge side valve 32 and the pressure inside the pump chamber 16, and thus a reduction in the controllability of the liquid chemical supply may occur According to the present embodiment described in detail above, the following results will be obtained.

(1) In order that the amount of fluctuation in the position of the bellows type partition member 14 detected by the displacement sensor 58 when the discharge side valve 32 is opened was feedback controlled, the pressure applied inside the pump chamber 16 was regulated. In this way, the amount of fluctuation can be controlled as desired, and thus fluctuations in the liquid chemical during the opening of the discharge side valve 32 can be suitably inhibited. Because of this, the flow rate of the liquid chemical supplied by the liquid chemical supply pump 10 can be controlled with a high degree of precision.

(2) The target value for the amount of fluctuation in the position of the bellows type partition member 14 during the aforementioned feedback control was set to zero. In this way, fluctuations in the liquid chemical can be even more suitably inhibited or avoided.

(3) During the intake of liquid chemical by enlarging the volume inside the pump chamber 16 due to the contraction of the bellows 14a, the amount of displacement of the bellows 14a was restricted so that the volume inside the pump chamber 16 will not reach the maximum value. In this way, even in the event that the pressure Pp inside the pump 16 is lower than the external pressure Pout, fluctuation of the bellows 14a that accompanies the opening of the discharge side valve 32 may occur, and thus the fact that the pressure Pp inside the pump chamber 16 is lower than the external pressure Pout can be detected.

(4) A construction was provided which applies pressure inside the pump chamber 16 by means of air pressure inside the pressure operation chamber 18 that is divided from the pump chamber 16 by the bellows type partition member 14. Here, because air is a compressable fluid, in the event that there is a differential between the pressure Pp of the pump chamber 16 and the external pressure Pout, the volume inside the pressure operation chamber 18 is easily changed. Because of this, the aforementioned differential can be suitably detected as fluctuations in the bellows type partition member 14 that accompany the opening of the discharge side valve 32.

(5) During the extension of bellows 14a, in order that the actual displacement speed of the bellows type partition member 14 was feedback controlled to the target value, the pressure inside the pressure operation chamber 18 was adjusted. In this way, the amount of discharge can be controlled with a high degree of precision in each discharge process.

(6) The bellows 14a was employed as a member that changes the volume inside the pump chamber 16. The bellows 14a will expand and contract in the axial direction thereof, and moreover, the change in volume of the pump chamber 16 with respect to the amount of expansion and contraction of the bellows 14a will be approximately linear. Because of this, the amount of liquid chemical drawn in and discharged can be easily controlled with a high degree of precision by adjusting the amount of expansion and contraction of the bellows 14a.

Second Embodiment

The second embodiment will be described below with reference to the drawings, and focus on the differences with the first embodiment above.

Figure 11:
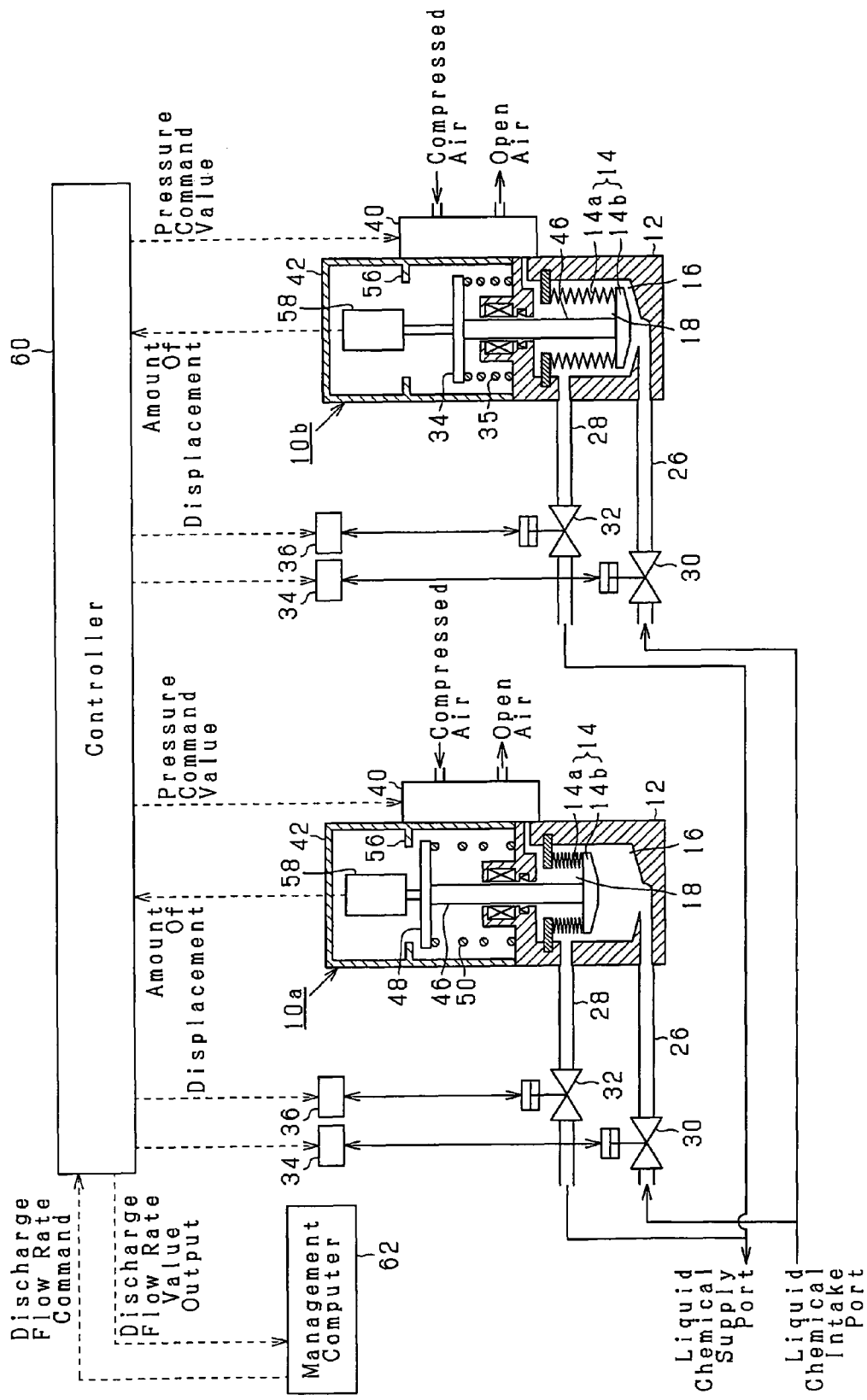
[FIG. 11] A drawing that shows the construction of a liquid chemical supply system according to a second embodiment.

The liquid chemical supply system according to the present embodiment is shown in FIG. 11.

As shown in the drawings, the liquid chemical supply system according to the present embodiment provides a plurality of liquid chemical supply pumps, and each pump repeatedly and sequentially performs a discharge operation and supply operation, and thus can achieve a continuous liquid chemical supply operation. Note that both of the two liquid chemical supply pumps 10a and 10b shown in FIG. 11 have the same construction as the liquid chemical supply pump 10 previously described in FIG. 1, and for the sake of convenience, the same reference numbers will be used to refer to the same components of each pump.

As shown in the drawings, the intake tube 26 for each liquid chemical supply pump 10a and 10b is connected to a common liquid chemical intake port (a liquid chemical bottle or a liquid chemical tube for the facility), and the discharge tube 28 is connected to a common liquid chemical supply port (a liquid chemical discharge nozzle).

In the drawings, the bellows 14a of the liquid chemical supply pump 10a is in the contracted state, and in this state, the discharge of liquid chemical that was resupplied into the pump chamber 16 will be performed by expanding the bellows 14a thereafter. The bellows 14a of the liquid chemical supply pump 10 is in the expanded state, and in this state, the intake of liquid chemical into the pump chamber 16 will be performed by contracting the bellows 14a thereafter.

The controller 60 will control the two liquid chemical supply pumps 10a and 10b so as to control the open/close state of the intake side valve 30 and the discharge side valve 32 based upon signals input as noted above, and output pressure command values to each electropneumatic regulator 40 in order to operate the electropneumatic regulators 40.

Figure 12:
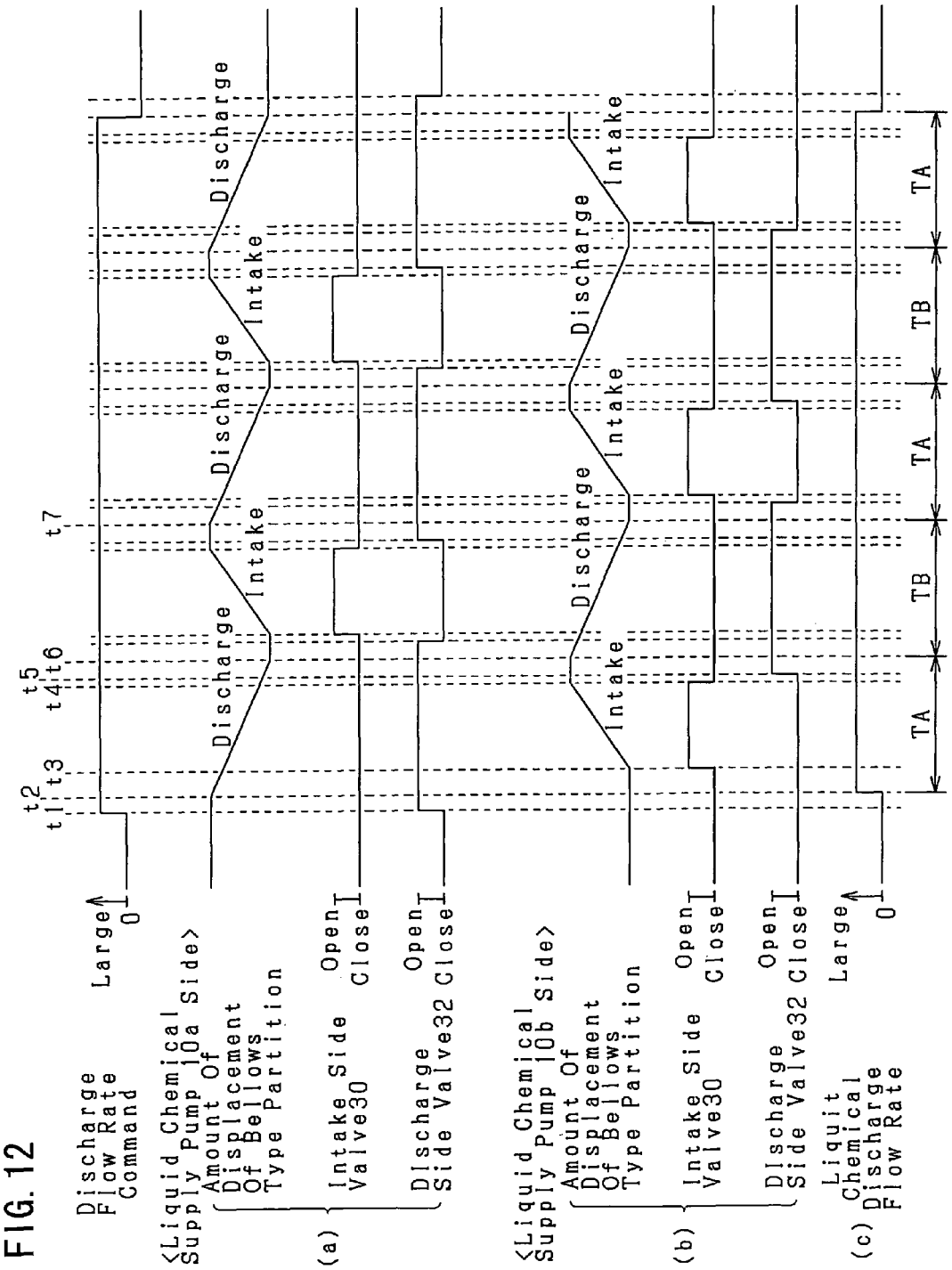
[FIG. 12] A time chart that shows a mode of controlling the supply of liquid chemical according to the same embodiment.

FIG. 12 shows the liquid chemical supply mode according to the present embodiment. More specifically, FIG. 12(a) shows the operation of the liquid chemical supply pump 10a, and FIG. 12(b) shows the operation of the liquid chemical supply pump 10b. In addition, FIG. 12(c) shows the total liquid chemical discharge flow rate by the two liquid chemical supply pumps 10a and 10b.

As shown in the drawings, prior to timing t1, the liquid chemical supply pumps 10a and 10b are in the state shown in FIG. 11, and the intake side valve 30 and the discharge side valve 32 are both closed. Then, after timing t1, if the management computer 62 transmits a discharge flow rate to the controller 60 at a value that is higher than "0", the liquid chemical supply pumps 10a and 10b will begin to intake and discharge liquid chemical.

In other words, on the liquid chemical supply pump 10a side, the discharge side valve 32 will be opened at timing t1, and then the bellows will expand together with a rise in air pressure by means of the electropneumatic regulator 40 and liquid chemical will be discharged (timing t2 to t6). In parallel with the liquid chemical discharge by the liquid chemical supply pump 10a, on the liquid chemical pump 10b side, the intake side valve 30 will be opened and the intake of liquid chemical performed at timing t3 to t4. Then, after the completion of liquid chemical intake, the discharge side valve 32 will be opened at timing t5. At timing t6, the bellows 14a will expand together with a rise in air pressure by means of the electropneumatic regulator 40 on the liquid chemical supply pump 10b side and liquid chemical will be discharged (timing t6-t7). Then, a liquid chemical intake/discharge operation will be sequentially performed between the liquid chemical supply pump 10a and 10b, and liquid chemical will be continuously discharged from the tip of the liquid chemical discharge nozzle.

In this case, the liquid chemical discharge interval TA of the liquid chemical supply pump 10a will be set to be continuous with the liquid chemical discharge interval TB of the liquid chemical supply pump 10b, and thus the liquid chemical will be continuously discharged without interruption. In addition, the liquid chemical discharge speed is controlled so as to be constant, and thus each discharge interval TA and TB are the same, and a stable supply of liquid chemical will be made possible.

However, even in this case, if there is a differential between the pressure Pp inside the pump chamber 16 and the pressure Pout on the liquid chemical supply port side during the opening of the discharge side valve 32, an abrupt flow of liquid chemical may occur together with the opening of the discharge side valve 32, and thus the supply flow rate of the liquid chemical via the liquid chemical supply port may fluctuate. Here, even if, for example, during the opening of the discharge side valve 32 on the liquid chemical supply pump 10a side, the pressure inside the pressure operation chamber 18 of the liquid chemical supply pump 10a is adjusted so as to match the pressure inside the pressure operation chamber 18 of the liquid chemical supply pump 10b, it will be difficult to match the pressure Pp inside the pump chamber 16 of the liquid chemical supply pump 10a with the pressure Pout on the liquid chemical supply port side. The pressure inside the pump chamber 16 is definitely not determined by the pressure inside the pressure operation chamber 18, and is due to the presence of the elastic force of the bellows 14a and the coil spring 50, and the possibility that the elastic force of the bellows 14a and coil spring 50 are variable.

Accordingly, in the present embodiment as well as in the first embodiment, the mode shown in FIG. 8 will perform feedback control of the amount of the fluctuation in the bellows 14a during the opening of the discharge side valve 32.

According to the present embodiment described above, the following effect will be obtained in addition to the aforementioned effects (1) to (6) of the first embodiment.

(7) The present embodiment comprises a pair of liquid chemical supply pumps 10a and 10b, the discharge tubes 28 are connected to a common liquid chemical supply port, and continuously supply liquid chemical to the exterior via the liquid chemical supply port by duplicating the liquid chemical intake and discharge intervals between the pair of liquid chemical supply pumps 10a and 10b. By performing feedback control of the aforementioned fluctuation with these settings, the liquid chemical flow rate supplied via the liquid chemical supply port can be made constant with a high degree of precision.

Third Embodiment

The third embodiment will be described below with reference to the drawings, and focus on the differences with the first embodiment above.

Figure 13:
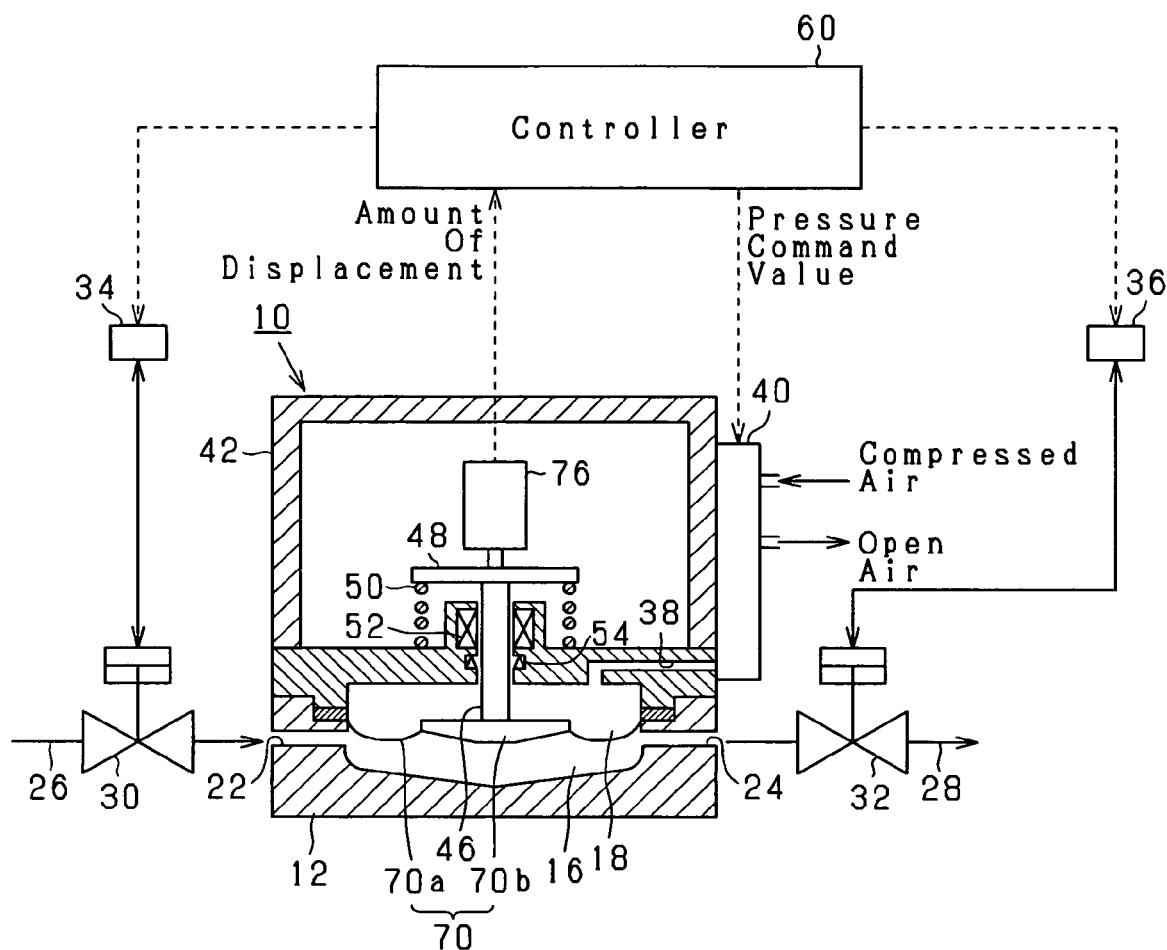
[FIG. 13] A drawing that shows the construction of a liquid chemical supply system according to a third embodiment.

The liquid chemical supply system according to the present embodiment is shown in FIG. 13. Note that in FIG. 13, the members corresponding to the members previously shown in FIG. 1 are referred to with the same reference numbers for the sake of convenience.

As shown in the drawings, the liquid chemical supply pump 10 according the present embodiment is constructed as a diaphragm type pump. In other words, instead of the bellows type partition member 14 previously shown in FIG. 1, the liquid chemical supply pump 10 comprises a diaphragm type partition member 70 comprising a diaphragm 70a and a partition plate 70b. Then, the pump chamber 16 and the pressure operation chamber 18 is divided by the diaphragm type partition member 70, and the volume inside the pump chamber 16 can be changed by means of the displacement of the diaphragm type partition 70, and thus liquid chemical can be drawn into the pump chamber 16 and liquid chemical can be discharged from the pump chamber 16.

One merit of this liquid chemical supply pump 10 is that compared to the bellows type, there will be less liquid chemical remaining in the pump chamber 16. However, in the case of the diaphragm type pump, there is a general tendency for the relationship between the amount of displacement of the diaphragm type partition member 70 and the amount of liquid chemical discharged to be nonlinear. Then, the linear relationship previously shown in FIG. 4 cannot be employed. Because of this, a process that takes the aforementioned nonlinear characteristic of the diaphragm type characteristics into consideration must be performed in the target displacement speed calculation unit B2 and the discharge flow rate calculation unit B14 previously shown in FIG. 3.

Even in cases in which this liquid chemical pump 10 is employed, in order to restrict the abrupt flow of liquid chemical that accompanies the opening of the discharge side valve 32, performing the feedback control previously shown in FIG. 8 will be effective.

According to the present embodiment described above, the aforementioned results (1) to (6) of the first embodiment can also be obtained.

Other Embodiments

Note that each of the aforementioned embodiments may be modified as follows.

In each of the aforementioned embodiments, feedback control of the amount of fluctuation in the bellows type partition member 14 and the diaphragm type partition member 70 was performed with integral control, but are not limited to this. For example, proportional integral control may also be performed.

In each of the aforementioned embodiments, in order that the pressure inside the pump chamber 16 used to feedback control the amount of fluctuation in the bellows type partition member 14 and the diaphragm type partition member 70 was indirectly regulated by adjusting the pressure inside the pressure operation chamber 18, the target value of the pressure inside the pressure operation chamber 18 was determined. However, the aforementioned embodiments are not limited to this. For example, the amount of correction to the pressure inside the pressure operation chamber 18 after completion of the intake process may be adjusted in response to the amount of fluctuation. Furthermore, for example, a pressure sensor may be provided inside the pump chamber 16, and the detection values of the pressure sensor prior to the opening of the discharge side valve 32 may be directly regulated in response to the amount of fluctuation. In this way as well, the pressure differential between the upstream and downstream sides of the discharge side valve 32 can be controlled downward by means of the displacement sensor 58 and the pressure sensor on the upstream side of the discharge side valve 32, without providing a pressure sensor on the downstream side thereof.

The number of liquid chemical supply pumps 10 may be 3 or more in the aforementioned second embodiment. Even in this case, continuously supplying liquid chemical via the liquid chemical supply port by duplicating the discharge interval and intake interval between the plurality of liquid chemical pumps is effective. In this case in particular, it is preferable to make the total amount of discharge that is discharged from the liquid chemical pumps to the liquid chemical supply port constant. In this way, control of the flow rate at which the liquid chemical is supplied by the liquid chemical supply system can be suitably performed. In this setting, an abrupt flow of liquid chemical that accompanies the opening of the discharge side valve 32 of any of the liquid chemical pumps can prevent the amount of liquid chemical to be supplied with a high degree of precision, and thus feedback control of the aforementioned amount of fluctuation is particularly effective.

Instead of electrically opening and closing the intake side valve 30, this may be mechanically opened and closed as a check valve. However, it is not appropriate to employ a check valve in situations in which the pressure on the upstream side of the intake side valve 30 is higher than the pressure inside the pump chamber 16 during the discharge process, and thus it is preferable to electrically open and close the intake side valve 30 as illustrated in each of the aforementioned embodiment.

In each of the aforementioned embodiments and the modifications thereof, in order that fluctuations in the liquid chemical that accompany the opening of the discharge side valve 32 will be inhibited, the amount of fluctuation in the bellows type partition member 14 and the diaphragm type partition member 70 was feedback controlled. However, the embodiments and modifications are not limited to this. In the event that inhibiting fluctuations in the liquid chemical on the upstream side of the intake side valve 30 that accompany the opening of the intake side valve 30 is desired, it is effective to perform feedback control of fluctuations in the liquid chemical in the bellows type partition member 14 and diaphragm type partition 70 in order to inhibit fluctuations that accompany the opening of the intake side valve 30.

The method of controlling the amount of discharge is not limited to feedback controlling the displacement speed of the bellows type partition member 14 and the diaphragm type partition member 70 to a target speed. For example, feedback control of the actual position to a target position each time may be performed.

The liquid chemical supply pump is not limited to one which applies pressure inside the pump chamber 16 by means of compressed air via a volume varying member that changes the volume of the pump chamber 16. However, in the event that compressed air is used, it will be easy to detect a pressure differential between the pump chamber 16 and the exterior thereof based upon the amount of fluctuation in the volume varying member due to the fact that gases can be compressed.

The liquid chemical supply system is not limited to one that employed in the semiconductor manufacturing process, and for example may be one that is employed in the manufacture of chemical products.

The invention claimed is:

1. A chemical liquid supply system, comprising:
a pump having a pump chamber, an intake port that is connected to the pump chamber, a discharge port that is connected to the pump chamber, and a volume manipulator configured to manipulate a volume of the pump chamber;
a port operator configured to electrically operate an opening and a closing of the intake port and the discharge port;
a volume measuring device configured to measure an amount of the volume of the pump chamber; and
a controller configured to control the volume manipulator and the port operator for the pump to perform suction of a liquid from the intake port and to discharge the liquid from the discharge port, wherein
the controller includes an adjuster configured to adjust a manipulation of the volume manipulator for reducing a fluctuation of the volume manipulator, using an amount of the fluctuation previously measured by the volume measuring device, and
the amount of the fluctuation is a difference between a first volume at a completion of the suction and a second volume at a start of the discharge.

2. The system according to claim 1, wherein the pump cyclically operates the suction and the discharge, and
the adjuster is configured to adjust the manipulation using the amount of the fluctuation measured in a previous cycle.

3. The system according to claim 1, wherein the system includes a plurality of pumps including a first phase pump and a second phase pump, and
a period of the suction of the first phase pump overlaps at least part of a period of the discharge of the second phase pump, and a period of the discharge of the first phase pump overlaps at least part of a period of the suction of the second phase pump.

4. The system according to claim 1, wherein the volume manipulator has a maximum limitation in the manipulation, and
the controller is configured to control the manipulation within a range that is preset to less than the maximum limitation, for allowing the fluctuation of the volume to be measured.

5. The system according to claim 1, wherein the volume manipulator operates with operating gas, and
the controller is configured to control a pressure provided to the volume manipulator.

* * * * *